United States Patent
Gädke et al.

(10) Patent No.: US 12,000,446 B2
(45) Date of Patent: Jun. 4, 2024

(54) DRUM BRAKE HAVING A LOAD MEASUREMENT DEVICE

(71) Applicant: Continental Teves AG & Co. OHG, Frankfurt am Main (DE)

(72) Inventors: Martin Gädke, Hofheim/Ts. (DE); Holger von Hayn, Bad Vilbel (DE); Matthias Schulitz, Frankfurt am Main (DE); Ahmed Sefo, Frankfurt am Main (DE); Uwe Bach, Niedernhausen (DE); Adrian Messner, Mainz (DE); Wolfgang Ritter, Oberursel/Ts. (DE); Jens Hoffmann, Darmstadt (DE); Falk Petzold, Frankfurt am Main (DE); Martin Kruse, Frankfurt am Main (DE); Christian Vey, Frankfurt am Main (DE); Ulrike Meyer, Schwalbach (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 377 days.

(21) Appl. No.: 17/612,422

(22) PCT Filed: May 20, 2020

(86) PCT No.: PCT/EP2020/064113
§ 371 (c)(1),
(2) Date: Nov. 19, 2021

(87) PCT Pub. No.: WO2020/239586
PCT Pub. Date: Dec. 3, 2020

(65) Prior Publication Data
US 2022/0228635 A1    Jul. 21, 2022

(30) Foreign Application Priority Data
May 24, 2019  (DE) ............... 10 2019 207 664.5

(51) Int. Cl.
F16D 65/22    (2006.01)
F16D 51/20    (2006.01)
(Continued)

(52) U.S. Cl.
CPC ............. F16D 65/22 (2013.01); F16D 51/24 (2013.01); F16D 65/08 (2013.01);
(Continued)

(58) Field of Classification Search
CPC .......... F16D 65/22; F16D 51/24; F16D 65/08; F16D 51/20; F16D 51/22; F16D 2051/001; F16D 2066/005; F16D 2121/24
See application file for complete search history.

(56) References Cited

U.S. PATENT DOCUMENTS 3,349,875 A * 10/1967 Stelzer .................... F16D 51/52
188/78
4,266,640 A *  5/1981 Woo ........................ F16D 51/24
188/363
(Continued)

FOREIGN PATENT DOCUMENTS

CN      86108224 A    7/1987
CN     105102841 A   11/2015
(Continued)

OTHER PUBLICATIONS

Chinese First Office Action dated Feb. 7, 2023 for the counterpart Chinese Patent Application No. 202080038526.2 and DeepL Translation.
(Continued)

Primary Examiner — Thomas W Irvin

(57) ABSTRACT

A drum brake having a brake drum, brake shoes, a carrier plate and a load measurement device in the region of an abutment is mountable on a steering knuckle. The abutment has a cylinder in which two pistons are guided, on the outer
(Continued)

end faces of which the abutment ends of the brake shoes rest and the inner end faces of which are each supported by a spring on a step in the cylinder. A hollow peg projects from the outside of the cylinder and penetrates an opening in the carrier plate, such that it can be received in a receiving space in the steering knuckle resting on the carrier plate or in a reinforcement element fixed on the steering knuckle.

13 Claims, 3 Drawing Sheets

(51) Int. Cl.
  *F16D 51/24* (2006.01)
  *F16D 65/08* (2006.01)
  *F16D 51/00* (2006.01)
  *F16D 66/00* (2006.01)
  *F16D 121/24* (2012.01)

(52) U.S. Cl.
  CPC .. *F16D 2051/001* (2013.01); *F16D 2066/005* (2013.01); *F16D 2121/24* (2013.01)

(56) References Cited

U.S. PATENT DOCUMENTS

| | | | | |
|---|---|---|---|---|
| 4,615,419 | A * | 10/1986 | Gaiser | F16D 65/14 303/112 |
| 5,960,912 | A * | 10/1999 | Nishizawa | F16D 28/00 188/1.11 E |
| 6,705,439 | B1 | 3/2004 | Wang | |
| 8,235,189 | B2 * | 8/2012 | Maehara | F16D 65/22 188/364 |
| 11,346,417 | B2 * | 5/2022 | Jo | F16D 51/22 |
| 11,788,589 | B2 * | 10/2023 | Jo | F16D 65/22 188/325 |
| 2007/0151818 | A1 * | 7/2007 | Linhoff | F16D 65/14 188/162 |
| 2007/0261928 | A1 | 11/2007 | Charmat | |
| 2013/0068576 | A1 | 3/2013 | Ko | |
| 2020/0191218 | A1 | 6/2020 | von Hayn et al. | |
| 2021/0190159 | A1 | 6/2021 | Bach et al. | |
| 2021/0396281 | A1 * | 12/2021 | Jo | F16D 51/22 |

FOREIGN PATENT DOCUMENTS

| | | |
|---|---|---|
| CN | 106460978 A | 2/2017 |
| DE | 102017217410 A1 | 4/2019 |
| DE | 102018202261 A1 | 4/2019 |
| EP | 0005675 A1 | 11/1979 |
| EP | 0523338 A2 | 1/1993 |
| EP | 2014948 A1 | 1/2009 |
| FR | 2104392 A5 | 4/1972 |
| GB | 1328785 A | 9/1973 |
| GB | 2088978 A | 6/1982 |
| JP | S6421825 A | 1/1989 |
| JP | H09329168 A | 12/1997 |
| JP | 2002505733 A | 2/2002 |
| JP | 2010144905 A | 7/2010 |
| KR | 20070062159 A | 6/2007 |
| KR | 20080004808 A | 1/2008 |
| KR | 20090057640 A | 6/2009 |
| KR | 20130029951 A | 3/2013 |
| WO | 99/53214 A1 | 10/1999 |
| WO | 2019063278 A1 | 4/2019 |
| WO | 2019072768 A1 | 4/2019 |

OTHER PUBLICATIONS

Chinese Notice of Allowance dated Mar. 13, 2023 for the counterpart Chinese Patent Application No. 202080038526.2 and DeepL Translation.

Korean Notice of Submission of Opinions dated Mar. 14, 2023 for the counterpart Korean Patent Application No. 10-2021-7035760 and Global Dossier Translation.

Ning Ma, "Optimum Design of Gap Adjustment Device for Drum Brake", 2016, China Academic Journal Electronic Publishing House and DeepL Translation.

Notice of Reasons for Refusal dated Nov. 17, 2022 for the counterpart Japanese Patent Application No. 2021-564846.

Korean Written Decision on Registration dated Sep. 7, 2023 for the counterpart Korean Patent Application No. 10-2021-7035760 and Global Dossier Translation.

International Search Report and Written Opinion dated Aug. 28, 2020 from corresponding International Patent Application No. PCT/EP2020/064113.

* cited by examiner

DRUM BRAKE HAVING A LOAD MEASUREMENT DEVICE

CROSS REFERENCE TO RELATED APPLICATIONS

This U.S. patent application claims the benefit of PCT patent application No. PCT/EP2020/064113, filed May 20, 2020, which claims the benefit of German patent application No. 10 2019 207 664.5, filed May 24, 2019, both of which are hereby incorporated by reference.

BACKGROUND

A drum brake of the type in question is described in German Laid-Open Application DE 10 2018 202 261 A1. According to this, an abutment is connected either to the carrier plate or, by means of screws which penetrate the carrier plate, to the steering knuckle situated behind the carrier plate. The abutment is of elastic design, thus enabling the braking forces that are introduced into the abutment from the brake shoes to be supported in an elastically flexible manner.

In addition, the aforementioned laid-open application already proposes to use the elastic flexibility to determine the braking forces (load) acting on the abutment during braking. The magnitude of these forces is required, in particular, for controlling a spreader device fitted with an electric motor. However, the laid-open application does not disclose any specific design of such a measurement device.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A drum brake is provided which can be mounted on a steering knuckle with a measurement device which provides sufficient measuring accuracy and/or precision such that the elastic flexibility may only be exercised over small distances.

Therefore, an abutment has a cylinder in which two pistons are guided, on the outer end faces of which the abutment ends of the brake shoes rest and the inner end faces of which are each supported by a spring on a step in the cylinder, and that a hollow peg projects from the outside of the cylinder, which peg penetrates an opening in the carrier plate, such that it can be received in a receiving space in a steering knuckle resting against the carrier plate or in a reinforcement element fixed on the steering knuckle.

If the opening in the carrier plate and the receiving space are designed to give an accurate fit with the outer cross section of the peg, the orientation of the abutment as a whole with respect to the steering knuckle is precisely defined, ensuring that a measuring accuracy is achieved.

In order to secure the cylinder on the steering knuckle or on the reinforcement element, the cylinder has lateral lugs for receiving screws, wherein the screws penetrate the carrier plate in order to be screwed to the steering knuckle or reinforcement element resting against the carrier plate. Instead of a screwed joint, it is also possible to implement a riveted joint.

When the brake is applied, the pistons are moved within the cylinder against the force of the springs. In this case, only small travel distances can be achieved since larger spring travel distances would have to be compensated for by increased actuation distances for the brake shoes. The springs therefore have a high spring rate.

At high spring rates, small movement distances of the pistons are sufficient to determine the forces acting on the pistons with sufficient measuring accuracy from a movement distance. For this purpose, the pistons are provided with elements that can be sensed, and sensors which respond to the elements that can be sensed are accommodated in the peg.

Typically, the elements that can be sensed consist of magnets, and the sensors consist of sensors that are sensitive to magnetic fields, these being, for example, Hall sensors or AMR sensors, which are based on the anisotropic magnetoresistive effect.

Inductive sensors are also suitable since no magnets are required for this purpose as elements that can be sensed.

Springs with a high spring constant are, for example, disk springs, it being possible to combine a plurality of disk springs to form packs. Spiral disk springs are also suitable since these have a lower hysteresis owing to a low internal friction.

However, "sleeve springs" have also proven suitable. These are sleeves with longitudinal slots distributed over their circumference, enabling the sleeves to expand when there is pressure on their ends. The restoring force is increased if the sleeve consists not of a single layer but of several layers which are wound into a spiral. Here, the spring constant can be set by means of the number of layers.

There are two possibilities for the arrangement of the elements that can be sensed: on the one hand, it is possible to arrange on the pistons laterally projecting pins which extend transversely to the pistons and whose outer ends, which point toward the peg, carry the elements that can be sensed, i.e. magnets, for example.

Here, the pins run in a longitudinal slot in an internal step in the cylinder, and therefore there may be simultaneously an anti-rotation safeguard for the pistons. In this case, the pins are situated at the inner ends of the pistons, with the result that they lie opposite the peg, where the sensors are situated.

On the other hand, however, the elements that can be sensed can also be mounted directly in or on the lateral surface of the pistons.

The sensors may be accommodated in a sensor housing, which is inserted with an accurate fit into the hollow peg, thus ensuring that the sensors are opposite the elements that can be sensed. The other end of the sensor housing may be provided with a multipoint connector. In this case, the sensor housing simultaneously forms a plug which closes the peg in a sealing manner.

The drum brake has an electromechanically actuable wheel brake actuator which is connected electrically for electrical supply and/or open-loop control and/or closed-loop control to an electronic control unit ECU, and wherein the measurement device is connected to the electronic control unit for open-loop control and/or closed-loop control of the actuator, and outputs electrical signals and/or measured values or sensor signals to the electronic control unit.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
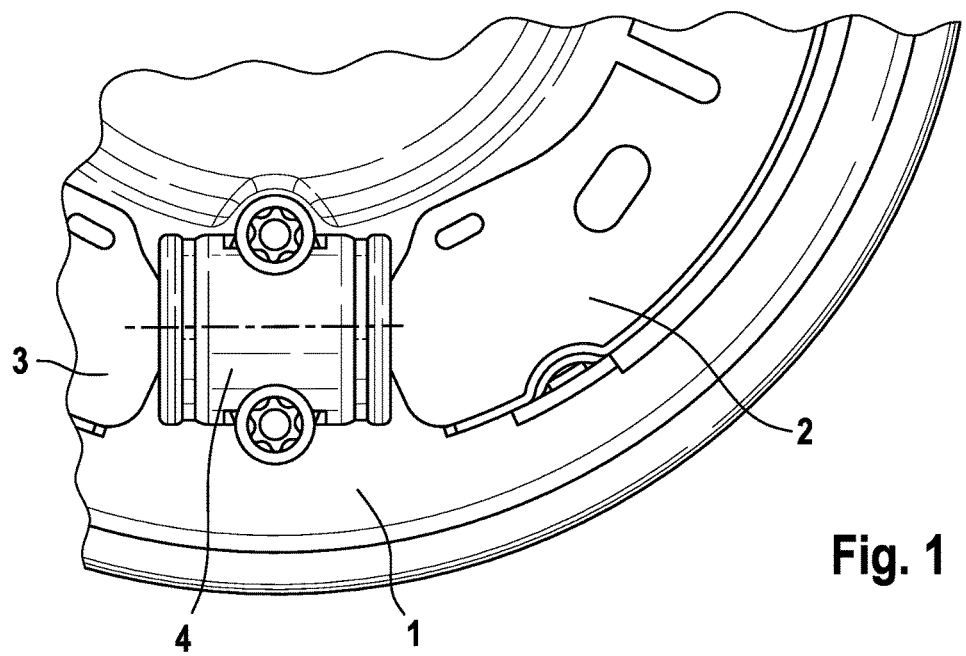
FIG. 1 shows a side view of a subsection of a drum brake having an abutment formed by a cylinder that accommodates two pistons.

FIG. 1 shows the plan view of a subsection of a drum brake. Two brake shoes 2, 3 are mounted actuably or fixed in such a way on a carrier plate 1 that they cooperate, i.e. are also supported, by means of their interfaces (not specially identified here), which are designed as abutment ends, with an abutment 4. Between the other two pressure ends (also not specifically identified here) of the brake shoes 2, 3, said ends being arranged opposite the abutment ends, there is an actuable spreader device which, in the context of brake actuation, can press the brake shoes 2, 3 against a brake drum (rotating during driving of the vehicle), which is not identified specifically here. This is therefore, typically, a specially configured design of a drum brake of the simplex type, the basic operation of which is fundamentally well known to a person skilled in the art of brakes in combination with hydraulic actuation and therefore does not need to be described in greater detail here.

Figure 2:
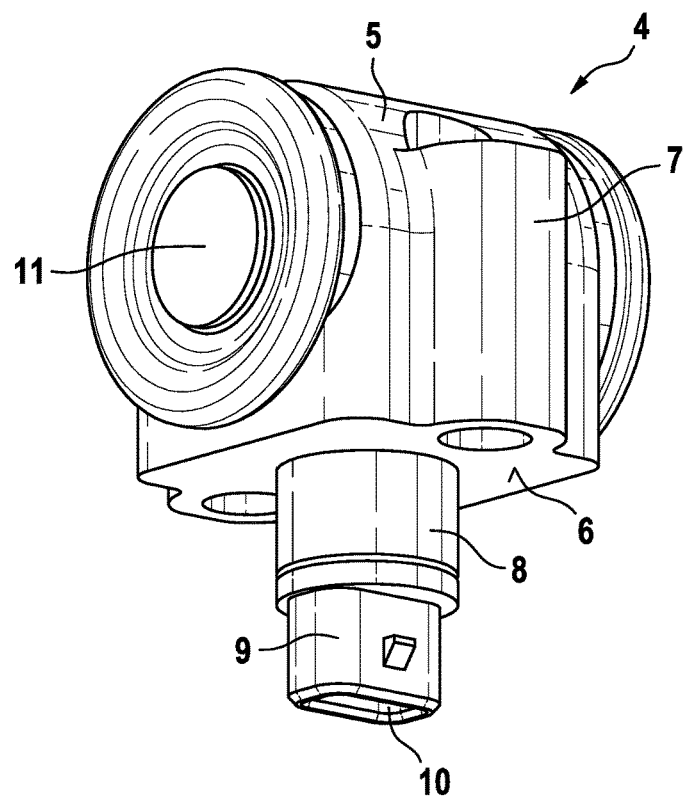
FIG. 2 shows a perspective external view of the abutment according to FIG. 1.

The abutment 4, which is illustrated in perspective in FIG. 2, consists of a cylinder 5, the casing of which is formed in part as a flattened bearing surface 6, by means of which it is placed on the carrier plate 1. Two raised lugs 7 for the passage of screws are situated perpendicularly to the bearing surface 6. Projecting from the bearing surface 6 there is furthermore a peg 8, which is of hollow design and which serves to receive a sensor housing 9, whose part projecting from the peg 8 is designed as a multipoint connector 10.

Figure 3:
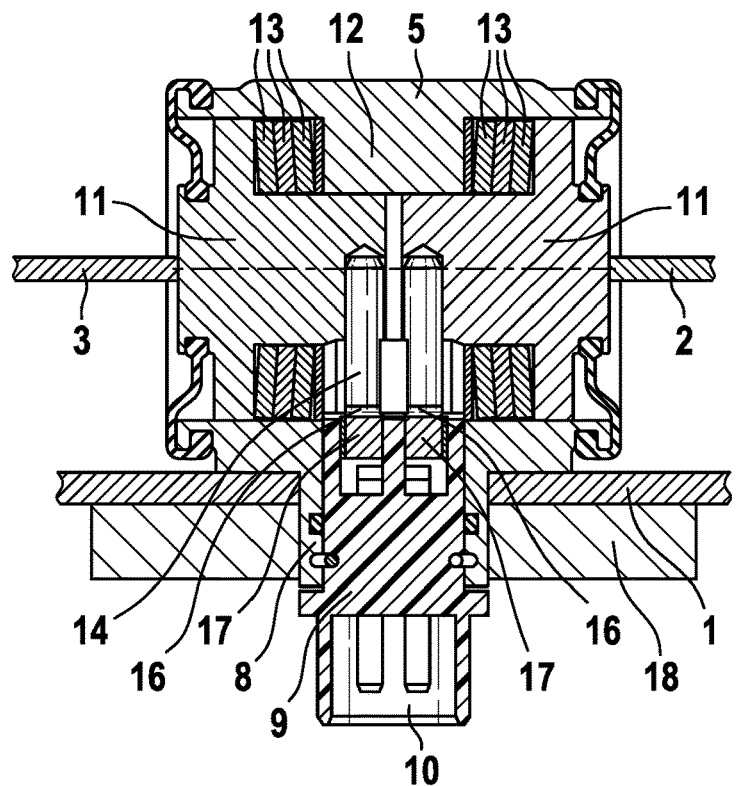
FIG. 3 shows a longitudinal section through the abutment according to a first embodiment.

FIG. 3 shows a first embodiment of the abutment 4 in a longitudinal section. Two stepped pistons 11 situated opposite one another are guided in the cylinder 5, wherein in each case the region of larger diameter faces outward and the region of smaller cross section faces inward into the cylinder 5. In this case, the abutment ends of the brake shoes 2, 3 rest against the outward-facing ends of the pistons 11. Sealing sleeves seal off the pistons 11 with respect to the cylinder 5.

The inner regions of the pistons 11 are guided in an annular step 12 in the center of the cylinder 5. Mounted on the region of the smaller cross section there is in each case a plurality of disk springs 13, which form a disk spring pack and which are thus situated between the region of the larger diameter and the step 12. The pressure exerted by the brake shoes 2, 3 on the ends of the pistons 11 causes the disk springs 13 to be compressed and thus causes a slight shifting of the pistons 11 in the direction of the axis of the cylinder 5.

Figure 4:
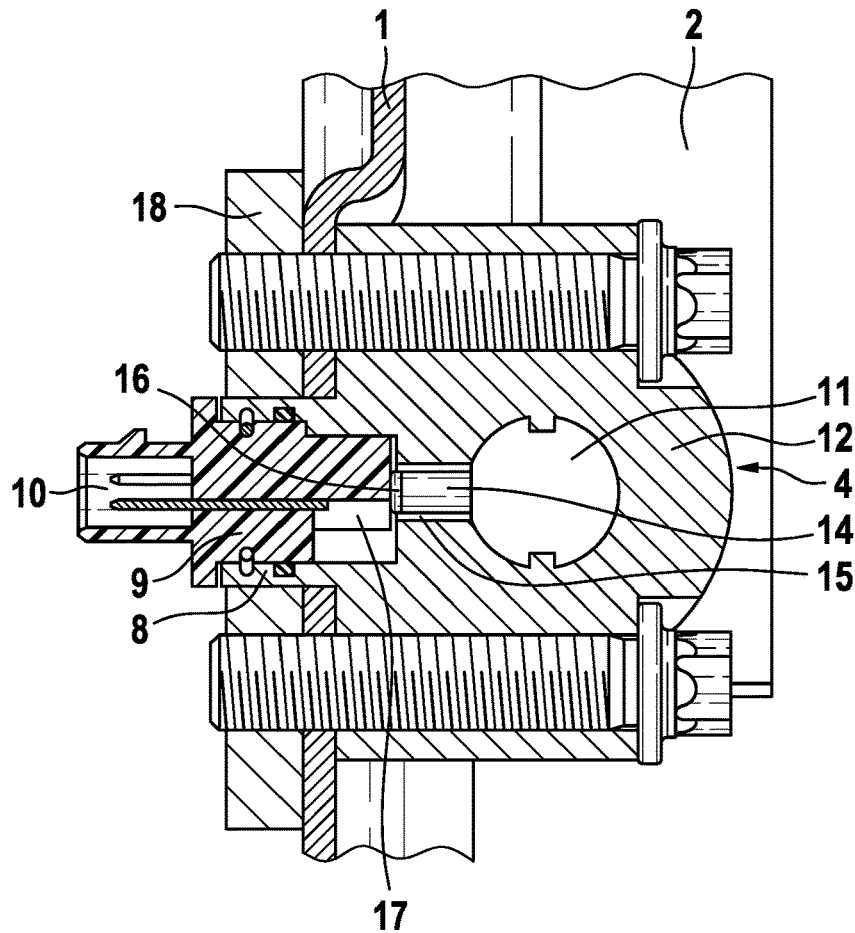
FIG. 4 shows a cross section through the abutment according to the first embodiment.

As can be seen in greater detail in FIG. 4, pins 14 project perpendicularly from the inner ends of each of the pistons 11, said pins being guided in a longitudinal slot 15 in the step 12 and thus forming an anti-rotation safeguard for the pistons 11. The ends thereof which face away from the pistons 11 are situated in front of the pegs 8 and are provided with magnets 16. Situated opposite them are sensors 17, which are secured on a circuit board in the sensor housing 9 and have an electrical connection to the multipoint connector 10 at the other end of the sensor housing 9.

It may be possible to dispense with the pins 14. In this case, the magnets 16 are secured directly on the piston 11, and the sensor housing 9 is extended, such that the end thereof reaches as far as the piston 11 with the sensors.

As can likewise be seen from FIG. 4, the carrier plate 1 is clamped between the bearing surface 6 on the abutment 4 and a steering knuckle 18 or a separate reinforcement element. The sensor housing 9 is inserted leak tightly into the peg 8 and may be provided with coding which allows positionally accurate insertion, such that the sensors 17 lie opposite the magnets 16 on the pins 14.

Figure 5:
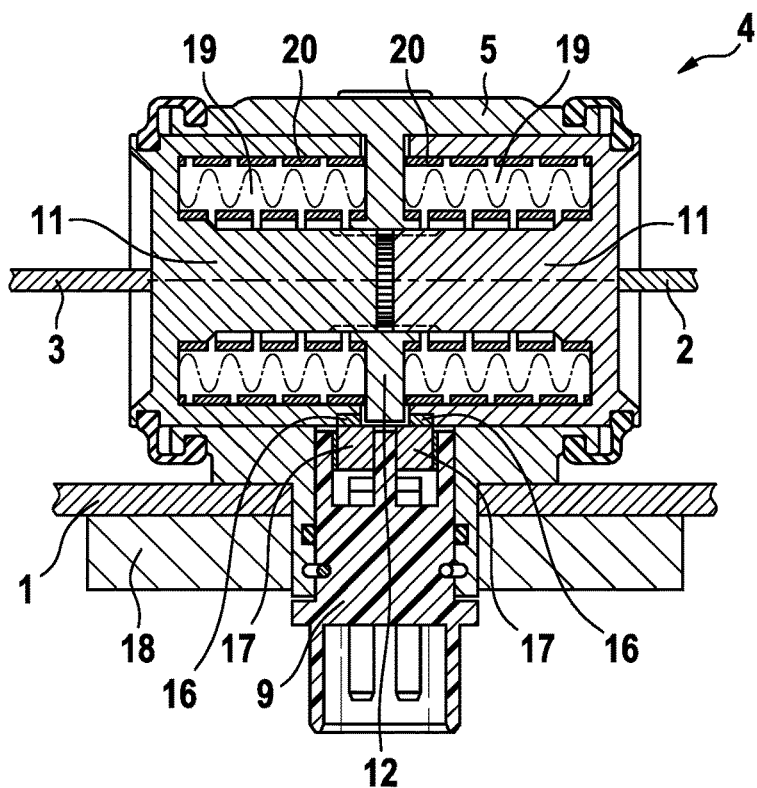
FIG. 5 shows a longitudinal section through the abutment according to a second embodiment.
Figure 6:
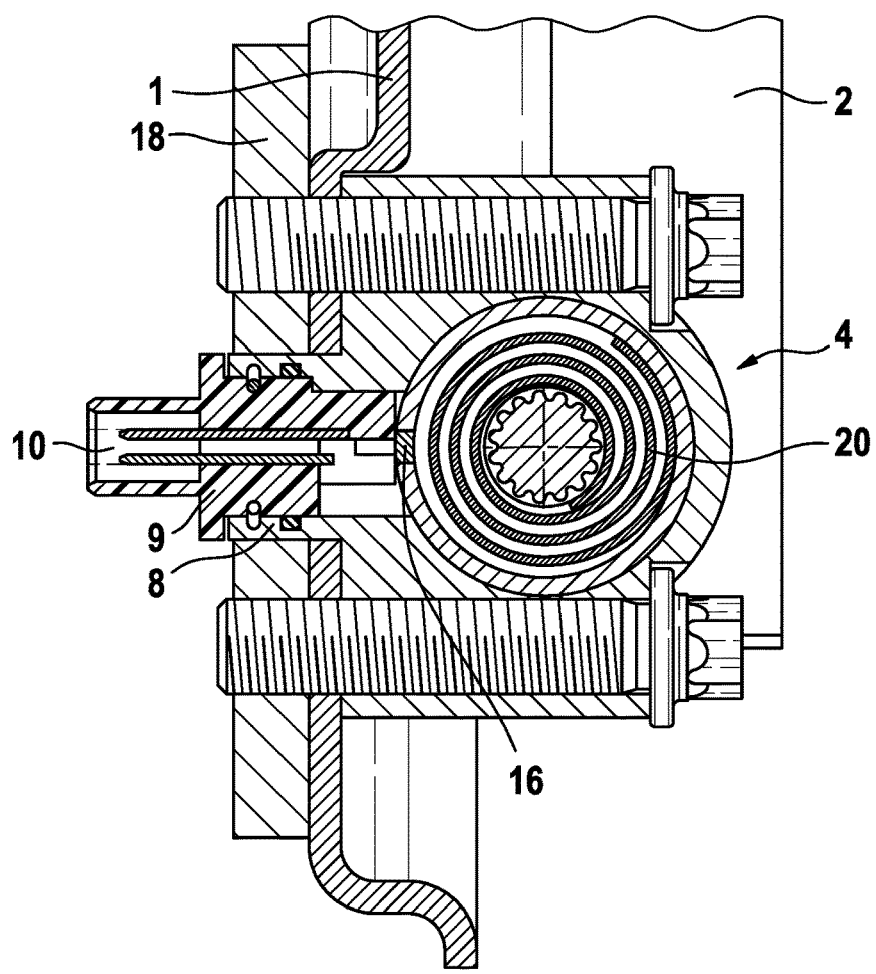
FIG. 6 shows a cross section through the abutment according to the second embodiment

A second embodiment of the abutment 4 is illustrated in FIGS. 5 and 6. However, the pistons 11, which have a constant cross section in this embodiment, have a coaxial ring-shaped annular space 19, in which sleeve springs 20 are inserted coaxially. These consist of a sheet metal strip which is provided with transversely extending slots and which is wound in a spiral shape to form a multilayer sleeve, wherein the slots then extend in the longitudinal direction of the sleeve. The slots allow elastically flexible expansion of the sleeve when forces are exerted on its ends.

In this embodiment, the step 12 is of narrow design, and therefore the inner ends of the pistons 11 extend to a location in front of the pegs 8. The magnets 16 can therefore be mounted directly in or on the lateral surface of the pistons 11, making it possible to dispense with pins 14—as in the first embodiment.

To ensure the placement of the pistons 11 in the cylinder 5 in a manner secured against rotation, slots or webs can be provided on the ends thereof, said slots or webs engaging with corresponding mating slots or mating webs on the inner lateral surface of the cylinder 5.

In this embodiment too—as FIG. 6 shows—the peg 8 is guided with an accurate fit through an opening in the carrier plate 1 in a receiving space in the steering knuckle 18 and screwed to the steering knuckle 18 by means of screws, which are passed through the lugs 7.

While the best modes for carrying out the invention have been described in detail the true scope of the disclosure should not be so limited, since those familiar with the art to which this invention relates will recognize various alternative designs and embodiments for practicing the invention within the scope of the appended claims.

The invention claimed is:

1. A drum brake comprising:
    a brake drum;
    two brake shoes, which can be applied to the brake drum, are secured on the brake shoe side of a carrier plate and each have a pressure end and an abutment end;
    a spreader device situated between the pressure ends;
    an abutment having a cylinder in which two pistons are guided, on the outer end faces of which the abutment ends of the brake shoes rest and the inner end faces of which are each supported by a spring on a step in the cylinder;

a load measurement device situated between the abutment ends wherein, the load measurement device determines the load prevailing at the abutment; and a hollow peg which projects from the outside of the cylinder and penetrates an opening in the carrier plate, such that it can be received in a receiving space located in one of a steering knuckle resting against the carrier plate and in a reinforcement element fixed on the steering knuckle.

2. The drum brake as claimed in claim 1, wherein the cylinder has lateral lugs for receiving one of screws and rivets, wherein the one of screws and rivets penetrate the carrier plate to be fixed to the steering knuckle resting against the carrier plate.

3. The drum brake as claimed in claim 1, further comprising sensors in the peg and elements in the pistons, wherein the elements are sensed by the sensors.

4. The drum brake as claimed in claim 3, wherein the sensors are accommodated in a sensor housing, which is inserted with an accurate fit into the hollow peg ensuring that the sensors are opposite the elements that can be sensed.

5. The drum brake as claimed in claim 1, wherein the springs are one of disk springs and spiral disk springs.

6. The drum brake as claimed in claim 1, wherein the springs are sleeve springs.

7. The drum brake as claimed in claim 1, wherein the pins project laterally from the pistons, the ends of which pins point toward the peg and which pins carry the elements that can be sensed.

8. The drum brake as claimed in claim 7, wherein the pins run in a longitudinal slot in an inner step in the cylinder.

9. The drum brake as claimed in claim 8, wherein the sensors are accommodated in a sensor housing, which is inserted with an accurate fit into the hollow peg, thus ensuring that the sensors are opposite the elements that can be sensed.

10. The drum brake as claimed in claim 8, wherein the the sensors are AMR sensors, and the elements that can be sensed are magnets.

11. The drum brake as claimed in claim 8, wherein the sensors are accommodated in a sensor housing, which is inserted with a correct orientation into the hollow peg, thus ensuring that the sensors are opposite the elements that can be sensed.

12. The drum brake as claimed in claim 11, wherein there is coding on the sensor housing to ensure the correct orientation.

13. The drum brake as claimed in claim 1, wherein the elements that can be sensed are mounted in or on the lateral surface of the pistons.

* * * * *